(12) United States Patent
Sharp

(10) Patent No.: US 6,450,457 B1
(45) Date of Patent: Sep. 17, 2002

(54) FAIRING ARRANGEMENT FOR AN AIRCRAFT

(75) Inventor: Kim Sharp, Chipping Sodbury (GB)

(73) Assignee: Airbus UK Limited, Bristol (GB)

( * ) Notice: Subject to any disclaimer, the term of this patent is extended or adjusted under 35 U.S.C. 154(b) by 0 days.

(21) Appl. No.: 09/647,797

(22) PCT Filed: Aug. 25, 2000

(86) PCT No.: PCT/GB00/03270

§ 371 (c)(1),
(2), (4) Date: Oct. 5, 2000

(87) PCT Pub. No.: WO01/15972

PCT Pub. Date: Mar. 8, 2001

(30) Foreign Application Priority Data

Aug. 27, 1999 (GB) .............................................. 9920318

(51) Int. Cl.⁷ ................................................ B64C 9/22
(52) U.S. Cl. ....................................................... 244/212
(58) Field of Search .................... 244/211, 212, 244/215, 90 R

(56) References Cited

U.S. PATENT DOCUMENTS

| 4,705,236 A | * | 11/1987 | Rudolph | .................. | 244/90 R |
| 4,962,902 A | | 10/1990 | Fortes | | |
| 5,098,043 A | * | 3/1992 | Arena | ........................ | 244/215 |
| 5,388,788 A | | 2/1995 | Rudolph | | |

FOREIGN PATENT DOCUMENTS

| GB | 2 235 169 | 2/1991 |
| GB | 2 238 026 | 5/1991 |
| GB | 2 238 991 | 6/1991 |
| GB | 2 323 576 | 9/1998 |

* cited by examiner

Primary Examiner—Charles T. Jordan
Assistant Examiner—Kevin Jakel
(74) Attorney, Agent, or Firm—Nixon & Vanderhye P.C.

(57) ABSTRACT

The fairing arrangement 28 comprises a first fairing portion 32 on a wing 10 and a second fairing portion 34 on an aileron 12 which is mounted on and angularly displaceable with respect to the wing. The fairing arrangement protrudes 28 outwardly of the aerodynamic profile S of the wing to cover part of an actuating device for the aileron. Parts of the first and second fairing portions 32, 34 are arranged to overlap each other to form a seal 45, one of said overlap parts defines an oblique sealing surface 44 which lies substantially in the direction of the path of movement of the aileron 12 over the normal operational range of movement of the aileron. The overlap parts 32, 34 of the first and second fairing portions overlap each other over a normal operational range of the aileron 12 to form the seal 45 but do not overlap to form a seal over the remainder of the range in one of the directions of movement of the control surface.

15 Claims, 5 Drawing Sheets

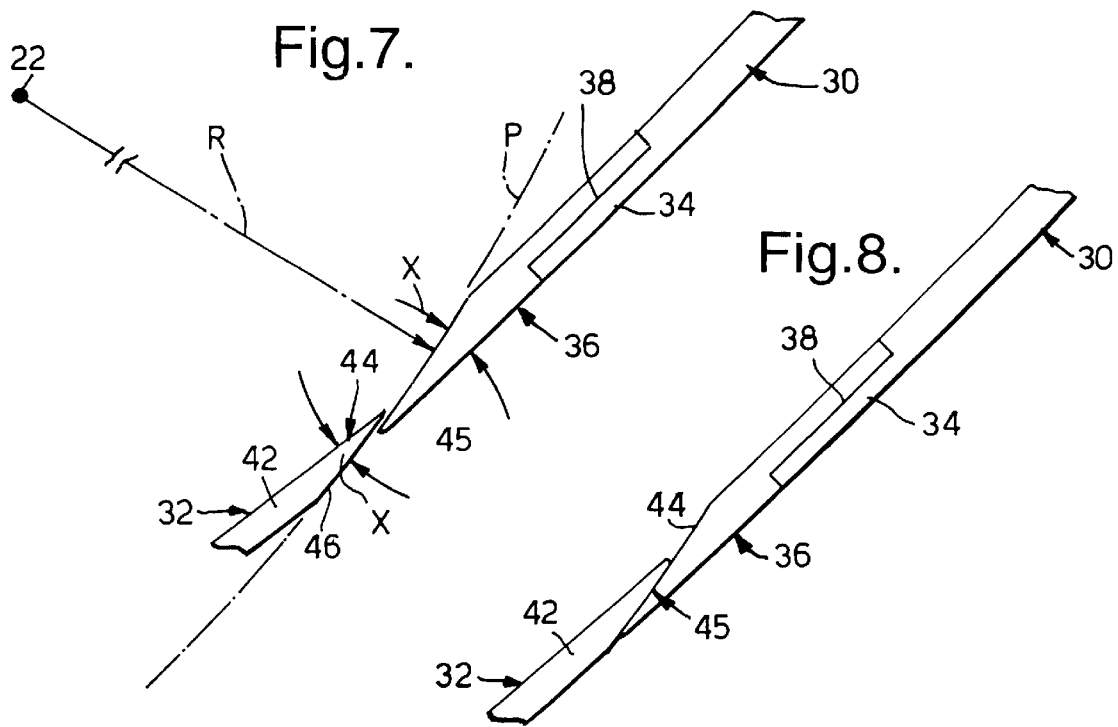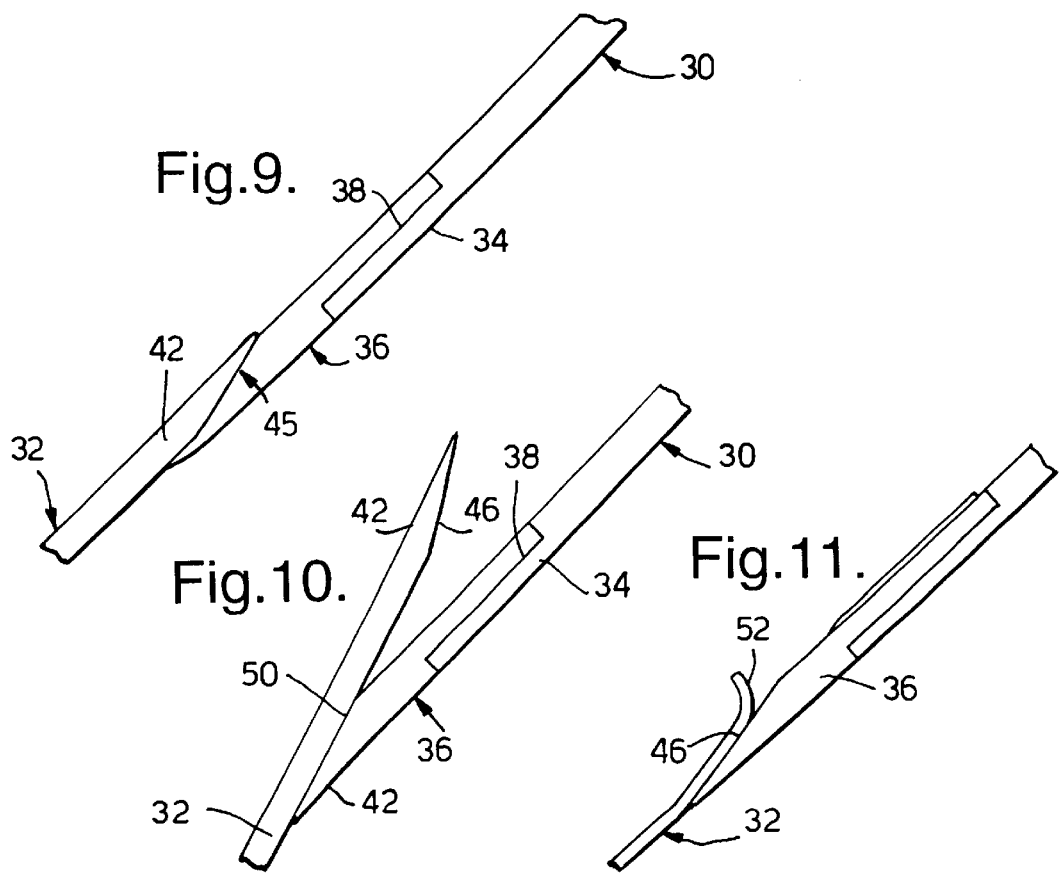

FAIRING ARRANGEMENT FOR AN AIRCRAFT

BACKGROUND OF THE INVENTION

1. Field of the Invention

The invention relates to a fairing arrangement for an aircraft and is primarily concerned with a fairing arrangement for a control surface such as an aileron for a wing of the aircraft.

2. Discussion of Prior Art

Control surfaces of aircraft are frequently operated by means of actuator jacks. The size of the actuator and the geometry of the wing and control surface often lead to the actuator protruding below the lower surface of the wing and a fairing arrangement is required to cover the jack or other actuating device. The present invention is primarily concerned with a fairing arrangement of that kind.

Various prior fairing arrangements involving flexible seals between a first fairing portion on a fixed structure such as a wing and second fairing structure on a control surface are described in GB-A-2323576. The seals maintain an aerodynamic profile and help to prevent ingress of debris etc. The seals disclosed are intended to operate over the full range of control surface movement or at least a major part of such movement and the seals need to be fairly long in the fore and aft direction. Long flexible seals are not ideal from the point of view of maintaining aerodynamic shape. Moreover, the deflection which is experienced makes the seals prone to fatigue and hence they have a short life in service which, again, is not ideal. Also, such long seals tend to experience a substantial amount of deflection particularly when the control surface is at an extremity of movement, for example where the ailerons droop to, say, −30° from a straight and level flight position when the aircraft is standing idle. Prior art seals have all been generally spherical in shape and this has tended to force a foreshortening of the overall fairing shape upon the designer in an attempt to avoid discontinuity of shape where the seal is encountered. This is not ideal, aerodynamically. In addition to the different aerodynamic shape which the, usually elongate, seal imposes on the fairing, all known prior art designs of seal have protruded into the airstream proud of the fairing, in cruise. Again this is undesirable, aerodynamically, owing to induced drag.

Normally, the fairings extend in the direction of flight whereas the usual hinge axis of the aileron lies at an angle, e.g. around 60° to the direction of flight. Therefore, in addition to the seals being able to accommodate at least a major part of the range of movement of the control surface, such seals also need to cope with translational movement of the ailerons which occurs as a result of the hinge axis being arranged at an angle to the direction of flight.

SUMMARY OF THE INVENTION

An object of the present invention is to provide an improved fairing arrangement for an aircraft which reduces or eliminates the problems outlined above yet enables sealing to be effective over the normal operational range of movement of the control surface.

According to one aspect of the invention there is provided a fairing arrangement for an aircraft comprising a first fairing portion on a fixed structure such as a wing and a second fairing portion on a control surface mounted on the fixed structure, the fairing arrangement protruding outwardly of the aerodynamic profile of the fixed structure and the control surface being angularly displaceable with respect to the fixed structure through a range of movement of the control surface between positive and negative limits either side of a straight and level flight position, parts of the first and second fairing portions being arranged so as to overlap each other over a normal operational range of the control surface to form a seal and being arranged so as not to form a seal over the remainder of the range in one of the directions of movement of the control surface.

By providing a seal which is effective primarily over the normal operational range of the aileron, the service life of the seal can be extended.

The fairing arrangement preferably extends in the direction of flight of the aircraft, i.e. the fore-and-aft direction, whereas the control surface may be angularly displaceable about a hinge line inclined at an angle to the direction of flight. In such a case, the seal may be of S-shaped form in order to maintain a seal during movement of the control surface about the inclined hinge line.

Preferably, the overlap parts form a seal over the entire remainder of the range of movement of the control surface in the other of the directions of movement from the straight and level flight position.

The remainder of the range is preferably in the negative direction of angular movement of the control surface.

One of the overlap parts may form a sealing surface for co-operation with the other overlap part. Preferably, said one of the overlap parts defines an oblique sealing surface which extends substantially in the direction of a path of movement of the control surface over the normal operational range of movement of the control surface. Preferably, said one overlap part is tapered towards the other to form the oblique surface.

By arranging for one of said overlap parts to provide a sealing surface which extends substantially in the direction of the path of movement of the control surface, any significant deflection of one or both overlap parts, usually in a direction normal to the direction of control surface movement, during movement of the control surface over the normal operating range can be minimised if not avoided altogether which is of considerable advantage from the point of view of durability. Moreover, as the sealing surface does not have to seal outside the normal operational range of control surface movement in one direction of movement, it can be made smaller in the fore-and-aft direction which is helpful at least from the point of view of maintaining aerodynamic shape Preferably, the overlap parts overlap slightly at one end of the operational range of movement of the control surface and/or overlap substantially fully at the other end of the operational range.

The sealing surface preferably extends in the fore-and-aft direction so as to be effective to seal over substantially its whole fore and aft extent.

In a preferred embodiment, one of the overlap parts comprises a sealing element which is preferably flexible and made, for example, from a fabric, rubberised or plastics material. The use of a flexible sealing element is useful in that it can effectively take up tolerances between the overlap parts to minimise or eliminate any gap therebetween. The sealing element may make contact with the other overlap part at least over part of the normal operational range of movement of the control surface. Preferably, the sealing element provides the said sealing surface.

A said overlap part may be formed with a lead-in portion to ensure correct co-operation with the other overlap part. The lead in portion is preferably curved.

Preferably, the sealing element is mounted on its associated fairing portion via a joint which minimises discontinuity between the outer surface of the fairing portion and the sealing element. The joint may be a halving-type joint. Conveniently, the sealing element may be carried by the first fairing portion.

In a preferred embodiment, the overlap part of the other fairing portion tapers towards said one overlap part to define a further oblique surface which provides a second sealing surface. The overlap part providing the further oblique surface may be tapered to form that surface. The said second sealing surface may also lie substantially in the direction of the path of movement of the control surface over the normal operational range of movement of the control surface. Preferably, the first and second sealing surfaces lie closely adjacent or in contact with each other throughout the normal operational range of movement of the control surface. Where the surfaces are in contact with each other, the first and second surfaces may slide across each other during movement of the control surface throughout the normal operational range.

The normal operating range of movement may be up to ±5°

The first and/or second sealing surface is preferably elongate in a direction transverse to the fore-and-aft direction. In such a case, the first and/or second sealing surface may be substantially S-shaped in its longitudinal direction and may be generally arcuate to accommodate the movement of the control surface about the inclined a hinge line.

Preferably, the angle of taper varies over the length of the sealing surface. Such an arrangement further helps to maintain the seal where movement of the control surface takes place about a hinge line arranged at an angle to the direction of flight.

According to another aspect of the invention there is provided an aircraft flying surface having a fairing arrangement thereon according to the first aspect of the invention or any of the consistory clauses relating thereto.

According to a further aspect of the invention there is provided an aircraft having thereon a fairing arrangement according to the first aspect of the invention or any of the consistory clauses relating thereto.

A fairing arrangement in accordance with the invention will now be described by way of example with reference to the accompanying drawings in which:

BRIEF DESCRIPTION OF THE DRAWING

FIG. 10 is a view similar to FIGS. 7 to 9 but showing the aileron in a drooped position when the aircraft is standing idle and FIG. 11 is a view similar to FIG. 8 showing one overlap part formed with a lead-in portion.

DETAILED DISCUSSION OF EMBODIMENTS

Figure 1:
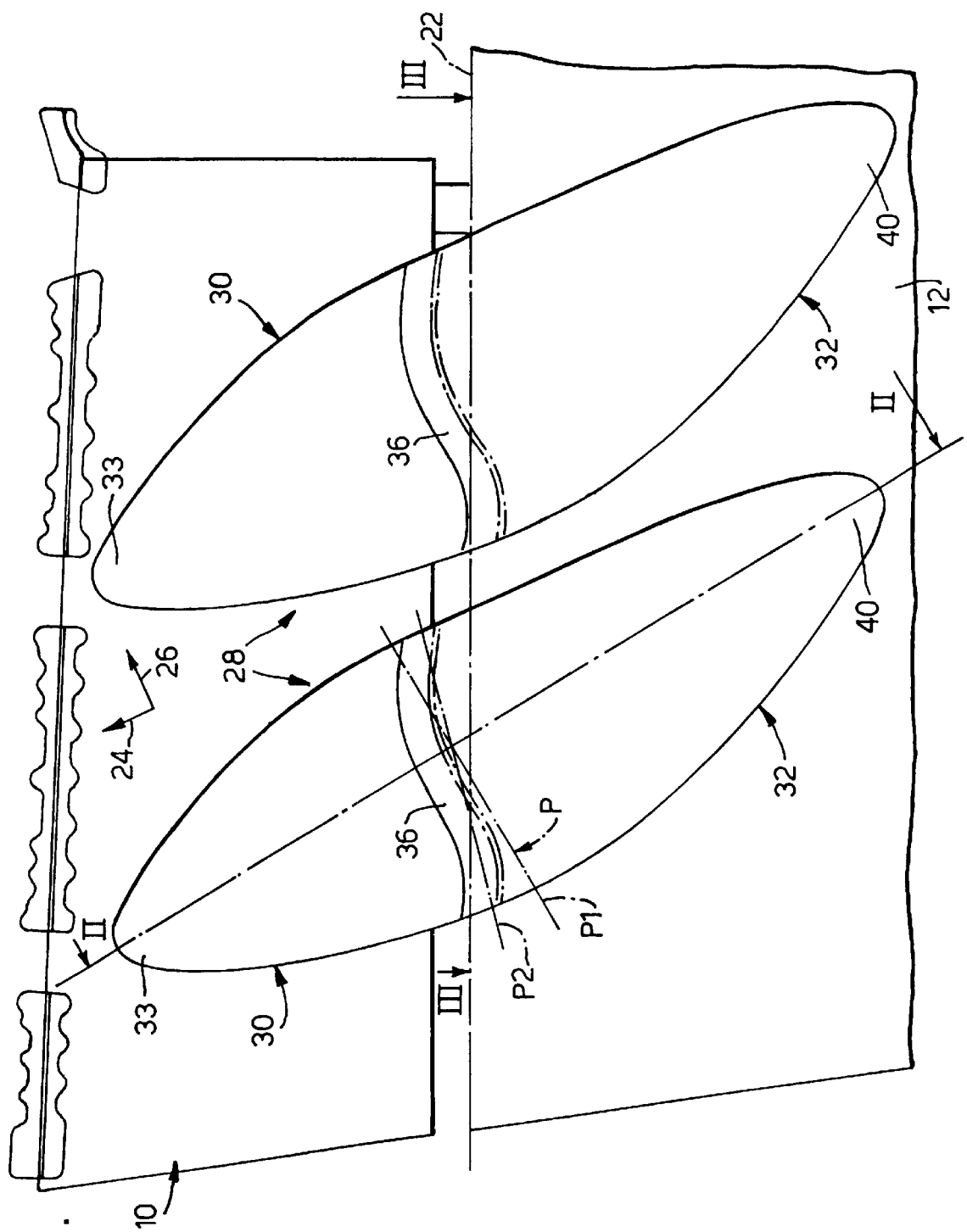
FIG. 1 is an underplan view of part of an aircraft wing showing two fairing arrangements in accordance with the invention arranged side by side.
Figure 4:
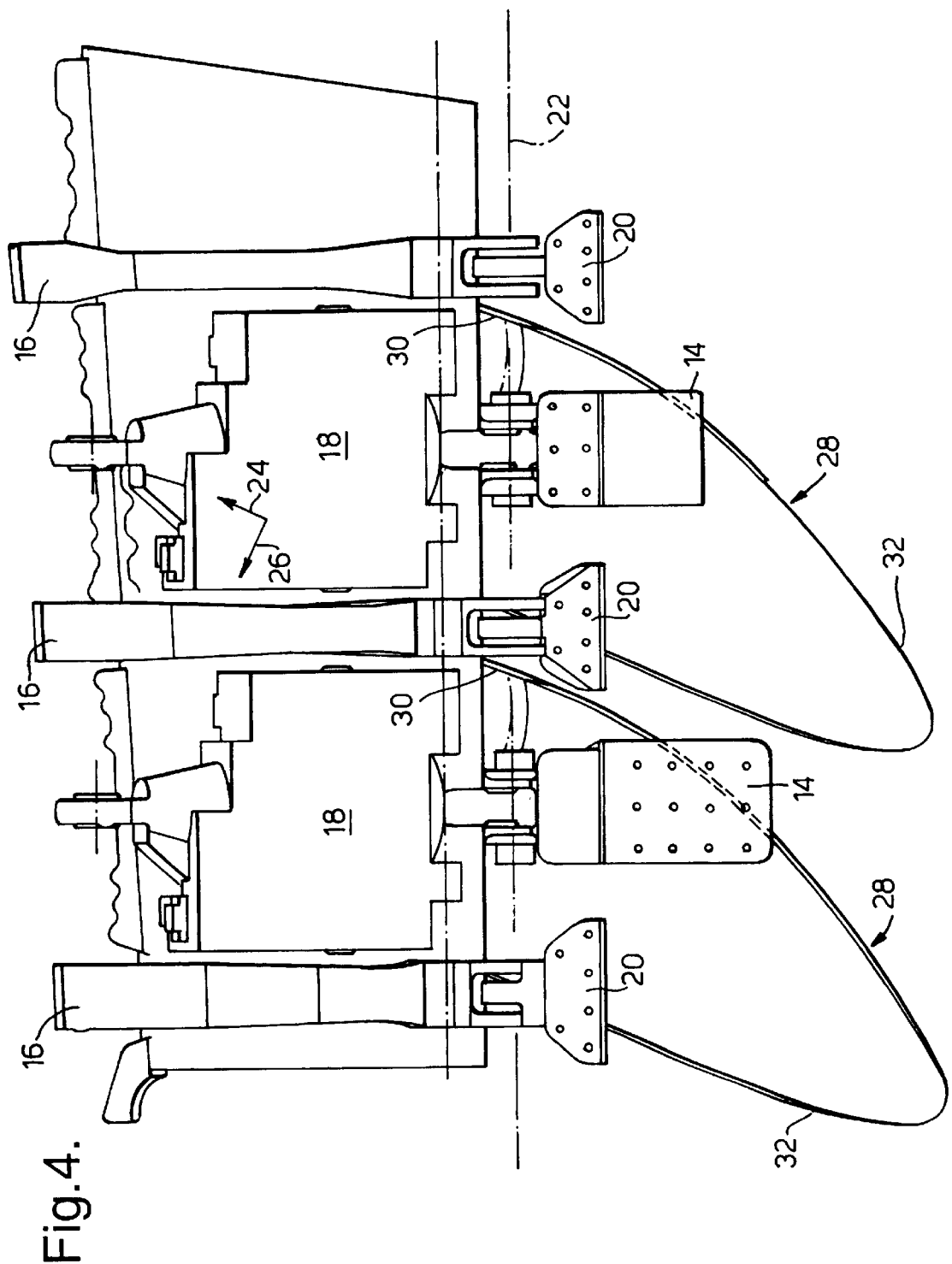
FIG. 4 is a plan view of part of the aircraft wing shown in FIG. 1 with an aileron omitted and showing actuators for the aileron.

Referring to FIGS. 1 to 4, an aircraft wing 10 carries an aileron 12 on brackets 14 (FIG. 4). Two aileron actuators 18 are mounted on the wing 10 in known manner and transmit movement to the aileron 12 through the brackets 14. Hinge parts 16 and further hinge parts 20 together define an aileron hinge line 22. The aileron 12 is attached to the hinge parts 20. FIGS. 1 and 4 carry directional arrows 24, 26 which are marked "FORWARD" AND "OUTBOARD". The forward arrow 24 indicates the direction of flight of the aircraft (also referred to herein as the fore-and-aft direction) . FIGS. 1 and 4 show the way in which two fairing arrangements 28 extend in the fore-and-aft direction.

Figure 2:
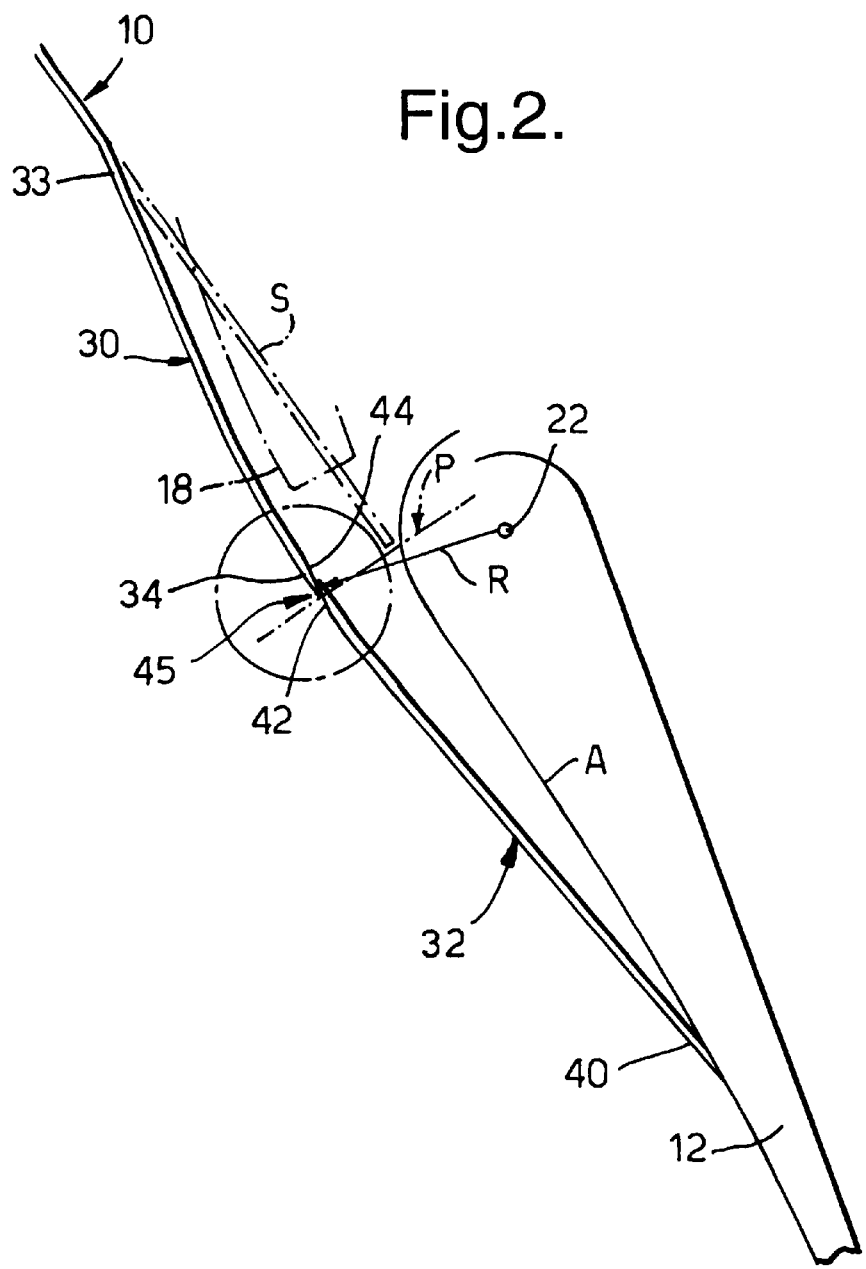
FIG. 2 is a cross section through one of the fairing arrangements in FIG. 1 on line II—II in FIG. 1.
Figure 3:
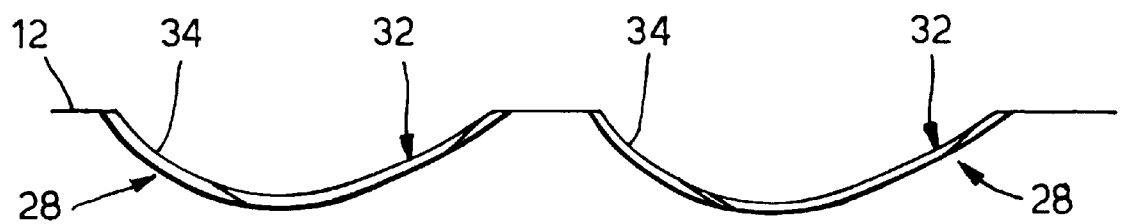
FIG. 3 is a cross section through the fairing arrangements in FIG. 1 on line III—III in FIG. 1.

Each fairing arrangement 28 comprises a first fairing portion 30 mounted on the wing 10 and a second fairing portion 32 mounted on the aileron 12. The first fairing portion 30 blends smoothly on to the surface of the wing 10 at a front end 33 and extends to an arcuate cross-section rear edge 34. The rear edge 34 includes a sealing element 36. The sealing element 36 is mounted via a halving joint 38 on the rear edge 34 as can be clearly seen in FIGS. 7 to 10. In that way there is a smooth secure join between the rear edge 34 and the sealing element 36. The sealing element 36 can be held in place by fasteners such as rivets or by adhesive or a combination of both. The second fairing portion 32 blends smoothly on to the surface of the aileron at a rear end 40 and extends to an arcuate cross front edge 42. It will be noted that each fairing arrangement 28 protrudes from the underside of the wing and aileron 10, 12 and therefore from the aerodynamic profiles S and A of the wing and aileron 10, 12 respectively as shown in FIG. 2. In that way each fairing arrangement 28 will cover an actuator 18 (shown in FIG. 4 and diagrammatically in FIG. 2) which protrudes from the under surface of the wing 10.

As can be seen from FIG. 7, the sealing element 36 of the first fairing portion 30 is tapered at an angle X such as 12° towards the second fairing portion 32 so as to provided a first sealing surface 44 oblique with respect to the adjacent surface of the fairing portion 30.

Figure 5:
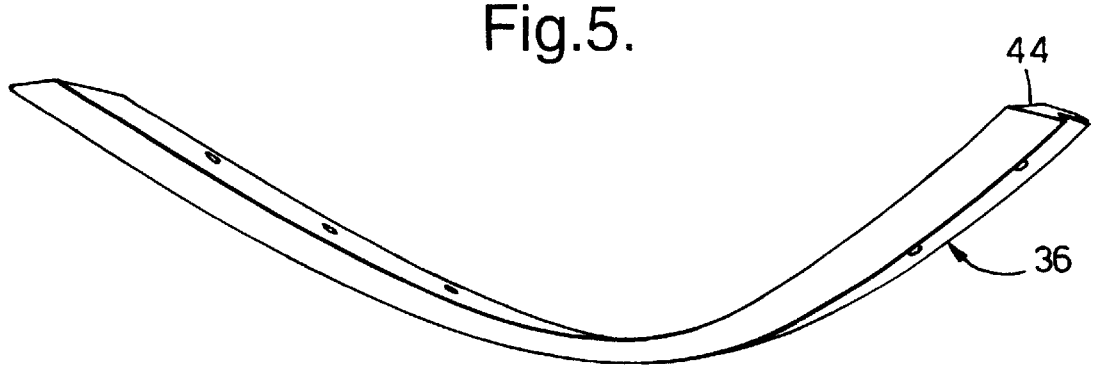
FIG. 5 is an elevation of a sealing element.
Figure 6:
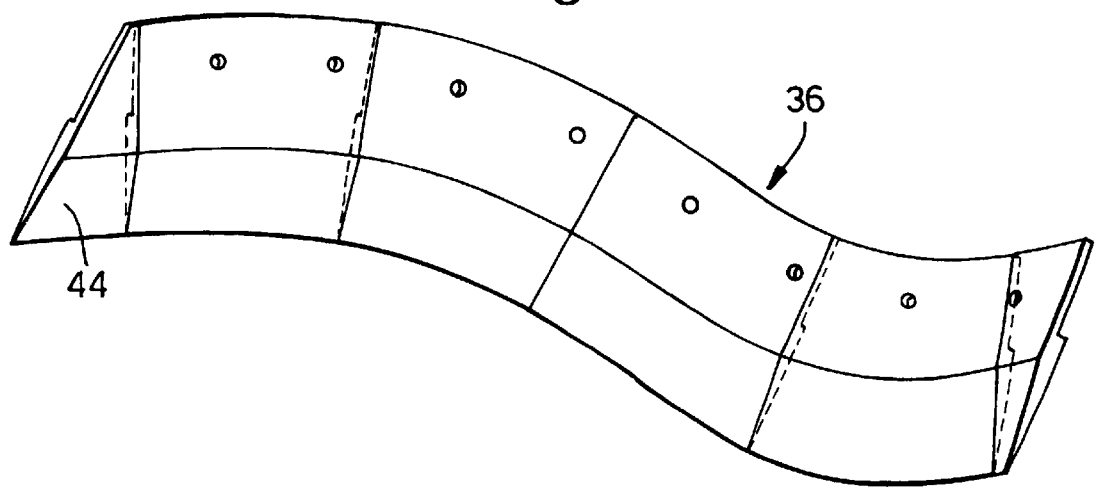
FIG. 6 is a plan view of the sealing element in FIG. 5, FIGS. 7 to 9 are views to a larger scale of overlap parts in a circle in FIG. 2 viewed from the opposite side, the overlap parts being positioned within the normal operational range of the aileron.

Similarly, the second fairing portion 32 is tapered at the same angle X towards the first fairing portion to provide a second sealing surface 46 oblique to the adjacent surface of the fairing portion 32. The oblique sealing surfaces 44, 46 define overlap parts of the first and second fairing portions 30, 32 respectively. The sealing element 36 may be made from a flexible plastics, rubberised or fabric material and is formed into an arcuate shape in elevation and an S-shape in plan view as shown respectively in FIGS. 5 and 6. The first sealing surface 44 defined by the sealing element 36 is intended to make sliding contact with the second sealing surface 46 to form a seal 45 and to take up manufacturing tolerances between the overlapping edges 34, 42 each of which is of S-shape in plan view as will be apparent from FIG. 1.

The aileron 12 is capable of a substantial range of angular movement each side of a 0° position (the position of the aileron in straight and level flight as shown in FIGS. 2 and 8) between positive and negative limits of movement. The positive direction of movement corresponds to an upward angular movement of the aileron from the 0° position and the negative direction corresponds to a downward angular movement from the 0° position. The normal operational range of the aileron 12 is considerably less that the fall range of movement between the positive and negative limits and is typically up to around ±5° or less.

The shape of the sealing element 36 and the overlapping edges 34, 42 respectively of the first and second fairing portions 30, 32 can be determined theoretically by an iterative method bearing in mind that each fairing arrangement 28 extends in the fore-and-aft direction and the hinge line 22 generally is at an angle to that direction. The steps begin by positioning an imaginary plane P at a position P1 which cuts through the fairing in the region of the hinge axis 22 generally at right angles to the fore-and-aft direction to form the first and second fairing portions 30, 32 and then moving the second fairing portion 32 about the hinge line 22 through its maximum negative range to form an intersection with the first fairing portion at the position of maximum negative displacement of the second fairing portion 32. The plane P can then be moved to a second position, e.g. position P2 set at an angle to P1 and the procedure can be repeated if necessary. The procedure can also be repeated for further planes spaced from P1 in the flight direction. The plane P can be moved in that manner through a series of steps until the point is reached where the optimum seal shape is achieved which may or may not be where plane P is parallel with the hinge axis 22. Once the optimum aft edge shape of the first fairing portion 30 has been defined, the second fairing portion 32 is then moved back to its central cruise flight operating position. The front edge of the second fairing portion is then shaped in a manner complementary to the previously defined shape of the aft edge of the first fairing portion, usually with a slight overlap to ensure that the edges will seal with the second fairing portion in that position. In that way the first and second fairing portions will substantially seal against each other both over the normal cruise operational range and when the second fairing portion is at its position of maximum negative displacement. At the same time interference between the first and second fairing portions at the position of maximum negative displacement is substantially avoided. The geometry may be designed so that some deflection of a flexible seal on one of the fairing portions takes place both at the position of maximum negative displacement and optionally at other positions of negative displacement in order to ensure an effective seal.

Design parameters to be fulfilled may include: a seal being formed all the way across the joint of the fairing arrangement, i.e. there be no clearance between first and second fairing portions save in positive displacement of the second fairing portion greater than in the normal cruise flight operating range; no interference between the second fairing portion and the wing or parts attached thereto; smooth sliding movement between a tapered surface on one fairing portion and a surface on the other fairing portion; predetermined deflection of a flexible seal positioned on one of the fairing portions as it engages the other fairing portion.

Over the normal operational range of the aileron 12, the distance between the edge 42 and the sealing surface 44 along a radius R passing through the hinge line 22 and a point on the sealing surface 44 can be substantially constant or will vary only slightly as shown in FIGS. 7 to 9 during movement of the aileron 12 over its normal operational range. Where such accuracy can be achieved, the edge 42 and the sealing surface 44 can be positioned sufficiently close to each other to provide an adequate seal between the overlapping parts of the fairing portions 30, 32 without the use of the sealing element 36. In such a case (not shown) the rear edge 34 of the first fairing portion 30 will be tapered to take the place of the sealing element 36. However, the use of the sealing element 36, as shown, is preferred as manufacturing tolerances may make it difficult to obtain the required degree of sealing without it. The angle of taper X preferably varies over the length of at least the sealing surface 44. In the example shown in FIG. 6, the angle X in the sealing element 36 increases from 9.6° to 12.6° to provide an accurate sealing relationship between the sealing surface 44 and the sealing surface 46.

As will be seen from FIG. 7, the first sealing surface 44 lies almost in the direction of the path of movement P of the aileron 12 in the region adjacent the second sealing surface 46. In the example shown, the first sealing surface 44 lies almost at right angles to a radius R passing through the hinge line 22. Similarly, the second sealing surface 46 lies almost but not quite in the direction of the path of movement P of the aileron 12 and, again, in the example shown lies almost at right angles to the radius R. Therefore, when the aileron 12 is moved about the hinge line 22, the first and second sealing surfaces 44, 46 can slide or pass over each other over the normal operational range whilst causing the sealing element 36 to deflect only to the extent shown in FIG. 9.

The extent to which the sealing surfaces 44, 46 overlap in practice can be seen from FIGS. 7 to 9. In FIG. 7, the aileron 12 has been move upwards through +5° from a 0° position (the position of the aileron 12 for straight and level flight) shown in FIG. 8. In the FIG. 7 position, the edges 34, 32 overlap each other slightly with a small clearance. In FIG. 8, the sealing surfaces 44, 46 overlap each other fully in sealing contact. In FIG. 9, the aileron has been moved downwards through −5° where there is a certain amount of interference which causes the sealing element 36 to deflect very slightly. However, in practice with the aircraft in normal cruise flight, the aileron 12 is unlikely to move through more than ±3° therefore reducing or eliminating such deflection of the sealing element 36. Hence in normal cruise flight the arrangement of the invention provides an adequate seal between the two fairing portions 30, 32 with an optimised, substantially non-interrupted, fairing arrangement 30, 32 (see FIGS. 7 to 9).

Where the aircraft is standing idle, it is quite usual for the aileron 12 to droop downwards as shown in FIG. 10. In that case, a surface portion 50 aft of the second sealing surface 46 slides over the first sealing surface 44 and deflects the sealing element 36. However, the deflection is not great and is not expected to have any significant effect on the overall durability of the sealing element. Where the aileron 12 is moved upwards, the sealing surfaces 44, 46 will provide the seal over the normal operational range but not beyond that.

Once the sealing surfaces 44, 46 separate due to angular movement beyond the normal operational range, the sealing effect ceases. In view of that, the seal 45 can be made relatively short in the fore-and-aft direction thereby avoiding the need to use a relatively long seal as proposed hitherto and thereby being advantageous from the point of view of maintaining aerodynamic shape.

As shown in broken lines in FIG. 11, the oblique sealing surface 46 may be formed in an alternative manner with a curved lead-in portion 52 thereon. The lead-in portion 52 helps to ensure that the tapered end of the sealing element 36 does not slip inside the fairing portion 32 when the latter moves into overlap with the sealing element.

What is claimed is:

1. A fairing arrangement for an aircraft wing comprising:
   a first fairing portion on the wing; and
   a second fairing portion on a control surface mounted on the wing for angular displacement in relation to the wing, the fairing arrangement protruding outwardly of an aerodynamically profile of the wing and control surface, the angular displacement of the control surface being at least through a normal operating range of movement between positive and negative limits either side of a straight and level flight position, wherein a tapered overlap is provided on at least an overlapping portion of each of the first and second fairing portions substantially to form an aerodynamic seal at least within said normal operating range.

2. A fairing arrangement according to claim 1 in which the normal operating range of control surface movement is up to ±5°.

3. A fairing arrangement according to claim 1 in which the tapered overlap comprises a first taper applied to a first overlap region of the first fairing portion co-operable with a second taper applied to a second overlap region of the second fairing portion whereby the first and second tapers will pass across one another during said angular displacement of the second fairing portion.

4. A fairing arrangement according to claim 3 in which contact takes place between the first and second tapers during at least part of the normal operating range of movement.

5. A fairing arrangement according to claim 4 in which the said contact takes place at least between the straight and level flight position and a position of maximum negative angular displacement of the control surface.

6. A fairing arrangement according to claim 1 in which at least one resilient taper of the tapered overlap includes resilient material.

7. A fairing arrangement according to claim 6 in which the at least one resilient taper is directionally reinforced to restrict resilient movement of the taper.

8. A fairing arrangement according claim 1 in which an external aerodynamic surface of the first fairing portion blends, substantially uninterrupted, into an external aerodynamic surface of the second fairing portion at least in the straight and level flight position.

9. A fairing arrangement according to claim 1 in which at least one taper surface extends substantially in the direction of a path of movement of the control surface during said angular displacement.

10. A fairing arrangement according to claim 1 in which a lead-in portion on at least one fairing portion ensures engagement of the tapered overlap when the fairing portions are angularly displaced towards one another.

11. A fairing arrangement according to claim 1 in which the fairing arrangement extends in the direction of flight of the aircraft, i.e. the fore-and-aft direction and the control surface is angularly displaceable about a hinge line at an angle to the direction of flight and in which the tapered overlap is of S-shaped form in order to maintain the overlap during movement of the control surface about the inclined hinge line.

12. An aircraft flying surface such as a wing having thereon a fairing arrangement according to claim 1.

13. A method of forming a joint in a fairing arrangement to bridge an aircraft wing and a control surface pivotally connected to the wing, the arrangement comprising first and second fairing portions carried, respectively, on the wing and control surface and extending in the direction of flight of the aircraft and protruding outwardly of an aerodynamic profile of the wing and control surface, the control surface and second fairing portion carried thereon being pivotable about a hinge axis inclined at an angle to the direction of flight, said pivotal movement having a range between positive and negative limits either side of a straight and level flight position, the method including forming a theoretical model of the exterior surfaces and hinge axis of the arrangement and carrying out the following theoretical steps in relation to the model:

1) selecting a position and orientation for a plane passing through the arrangement in the region of the hinge axis in a direction generally normal to the exterior surface of the arrangement;

2) cutting the arrangement into said first and second fairing portions with said plane;

3) rotating the second fairing portion about the hinge axis to a maximum negative position to intersect the first fairing position along an intersection line corresponding to the shape of the second fairing portion;

4) assessing the effect of the shape and position of the intersection line on relevant design parameters for the fairing arrangement;

5) repeating steps 1 to 4 as necessary;

6) selecting as necessary a said intersection line which fulfils the relevant design parameters, and 7) forming an overlapping joint at the intersection line where both the first and second fairing portions are at least partially tapered.

14. A method according to claim 13 including the step of forming an overlap between the first and second fairing portions at the joint in order to allow an aerodynamic seal substantially to be created at the joint over a normal cruise flight operating range of the said pivotal movement.

15. A method according to claim 14 including the steps of creating a tapered said overlap of structures for the first and second fairing portions at the joint by forming at least one tapered surface on one of the first and second fairing portions and in which a said design parameter comprises the optimisation of sliding movement of at least one tapered surface on one of the fairing portions in relation to a surface on the other fairing portion during pivotal movement in the normal cruise flight operating range whereby to optimise the aerodynamic seal and/or joint durability within the said range.

* * * * *